US007010628B2

(12) United States Patent  (10) Patent No.: US 7,010,628 B2
Cloud et al.                     (45) Date of Patent:       Mar. 7, 2006

(54) SYSTEM AND METHOD FOR CONVERTING RADIO CONTROL TRANSMITTER AND JOYSTICK CONTROLLER SIGNALS INTO UNIVERSAL SERIAL BUS SIGNALS

(75) Inventors: Neal E. Cloud, Tolono, IL (US); Mark D. Williams, Champaign, IL (US); Scott Kemp, Corvallis, OR (US)

(73) Assignee: Hobbico, Inc., Champaign, IL (US)

( * ) Notice: Subject to any disclaimer, the term of this patent is extended or adjusted under 35 U.S.C. 154(b) by 0 days.

(21) Appl. No.: 10/990,850

(22) Filed: Nov. 17, 2004

(65) Prior Publication Data

US 2005/0091423 A1   Apr. 28, 2005

Related U.S. Application Data

(62) Division of application No. 10/354,484, filed on Jan. 30, 2003, now Pat. No. 6,842,804.

(60) Provisional application No. 60/353,631, filed on Jan. 31, 2002.

(51) Int. Cl.
*G60F 13/38* (2006.01)
(52) U.S. Cl. .......................... 710/72; 710/63; 710/315; 345/161; 446/456
(58) Field of Classification Search ............... 710/8, 710/27, 63, 72, 100, 301, 315, 313; 345/161, 345/158; 273/148 B; 446/456, 454
See application file for complete search history.

(56) References Cited

U.S. PATENT DOCUMENTS

| | | | |
|---|---|---|---|
| 5,226,124 A * | 7/1993 | Stern | 710/72 |
| 5,315,515 A | 5/1994 | Schmitz | |
| 5,610,631 A * | 3/1997 | Bouton et al. | 345/161 |
| 5,752,880 A | 5/1998 | Gabai et al. | |
| 5,793,356 A | 8/1998 | Svancarek et al. | |
| 5,896,125 A * | 4/1999 | Niedzwiecki | 345/168 |
| 5,995,884 A | 11/1999 | Allen et al. | |
| 6,098,130 A * | 8/2000 | Wang | 710/100 |
| 6,293,798 B1 * | 9/2001 | Boyle et al. | 434/29 |
| 6,359,610 B1 | 3/2002 | Shah et al. | |
| 6,512,508 B1 | 1/2003 | Harrow et al. | |

* cited by examiner

*Primary Examiner*—Kim Huynh
(74) *Attorney, Agent, or Firm*—Gardner Carton & Douglas LLP

(57) ABSTRACT

A device for converting joystick controller generated analog and digital signals into Universal Serial Bus (USB) format, or for converting imported pulse position modulated (PPM) encoded signals from an external radio control (RC) transmitter into USB format data. The device is used, in an embodiment, for controlling simulated RC model aircraft as displayed, for example on a personal computer screen through the use of computer software. In an embodiment, the device includes a pair of two-axis gimbals, an auxiliary channel control potentiometer, and various control key switches to generate analog and digital joystick type signals as a result of direct manipulation by a user. The device also includes microcontroller circuitry for importing PPM signals, such as PPM signals generated by a commercially available model aircraft RC transmitter, to a USB port signal for interface with a computer.

25 Claims, 3 Drawing Sheets

SYSTEM AND METHOD FOR CONVERTING RADIO CONTROL TRANSMITTER AND JOYSTICK CONTROLLER SIGNALS INTO UNIVERSAL SERIAL BUS SIGNALS

CROSS-REFERENCE TO RELATED PATENT APPLICATIONS

This patent application is a divisional of U.S. patent application Ser. No. 10/354,484, filed Jan. 30, 2003, which claims the benefit of U.S. Provisional Patent Application No. 60/353,631, filed Jan. 31, 2002, herein incorporated by reference in its entirety for all purposes.

FIELD OF THE INVENTION

The invention generally relates to the control of model aircraft with joystick controllers, and to signal converters therefor. More specifically, the invention comprises a system and a method for converting both self-generated and externally generated analog and digital control signals from a joystick controller or radio control transmitter into Universal Serial Bus (USB) format for interface with a computer.

BACKGROUND OF THE INVENTION

Radio controlled or radio control ("RC") model aircraft, including model airplanes and helicopters, are conventionally operated remotely with an RC transmitter. RC transmitters are commercially available from manufacturers including Airtronics™, Futaba™, JR™, Hitec™, and Tower Hobbies™. RC transmitters are handheld devices that include both joystick-type controls (such as gimbals, switches, and knobs) for producing control signals and a radio frequency signal transmission circuit for sending the control signals to a model aircraft. The control signals produced using conventional RC transmitters include both analog and digital signals. By manipulating the joystick-type controls of a conventional RC transmitter, a user might have the ability to, among other things, control the model aircraft by adjusting its elevators and ailerons, turning its rudders, or by raising or lowering its throttle.

While RC transmitters are now widely used for controlling RC model aircraft, they present certain disadvantages. One disadvantage arises from the high level of skill required for using an RC transmitter to safely fly a model aircraft. Learning how to fly a model aircraft with an RC transmitter requires practice, and even an experienced user may have difficulty using the RC transmitter in certain environments (for example, in an environment with trees or shifting winds). RC model aircraft are often damaged or destroyed by inexperienced users of an RC transmitter. Many accidents directly result from a lack of training in the use of RC transmitters. Such accidents may be avoided by proper training, for example, through training with a computer simulated RC model aircraft.

There is, therefore, a need in the art for an easier and more efficient method and system for interfacing an RC transmitter with a personal computer.

BRIEF SUMMARY OF THE INVENTION

In an embodiment, the present invention meets the foregoing need by providing a method and a system for connecting a joystick controller to a USB port on a personal computer. In another embodiment, the present invention provides a method and system for connecting an RC transmitter to a USB port on a personal computer through an adapter, which may be built into a joystick controller. In all embodiments, the present invention is effective for taking control signals generated by a joystick controller or RC transmitter and converting the control signals into USB format data.

In different embodiments of the present invention, both self-generated and externally generated control signals are converted into USB format data for use with a personal computer. Self-generated control signals include analog and digital signals generated by a joystick controller designed for interface with a personal computer. Externally generated control signals include analog and digital signals generated by an RC transmitter, such as are commonly used for controlling RC model aircraft. According to an embodiment of the present invention in which externally generated control signals are converted into USB format data, an RC transmitter is interfaced with a USB port on a personal computer through an adapter, which is built into a joystick controller.

The use of the USB format in accordance with the present invention provides advantages over other methods and systems for connecting a joystick controller to a computer. In particular, a connection to a USB port provides an advantage over a connection to a standard serial port in that USB ports provide additional bandwidth for control signals from the joystick controller to be sent to the personal computer. With a connection to a standard serial port, there is a noticeable delay between when a joystick controller is manipulated and when a simulated RC model aircraft responds. Such a delay is highly undesirable for a simulation meant to reproduce as accurately as possible the real experience of flying a model aircraft, and the use of a USB port and USB format data in accordance with the present invention provides a distinct advantage over the use of standard serial ports. In addition, the USB format and USB port interface provide higher resolution data; more data may be transferred in a given length of time than is possible using a parallel port.

Other advantages to the use of USB ports and USB format data are related to the number of USB ports available on most personal computers. Typically, personal computers come with two or more USB ports. Additional USB ports are easily available through the use of USB port hubs. In contrast, many personal computers only provide a single parallel port, which is usually connected to a printer. For a joystick controller to be connected to the parallel port, the printer must be disconnected or additional hardware switch must be purchased and installed. The number of USB ports provides an advantage over an embodiment of the invention in which a parallel port might be used.

Advantageously, the USB format and USB port interface is easier to configure than conventional data formats or ports to a personal computer. USB ports require minimal setup prior to use, and are significantly more convenient for end users than serial or parallel ports, which often require software conflicts to be resolved.

Conventional RC transmitters produce a pulse position modulated (PPM) signal, which is fed to a radio frequency signal transmission circuit and broadcast to an RC model aircraft. Accordingly, an embodiment of the present invention provides an adapter comprising microcontroller circuitry for converting imported PPM signals from an external RC transmitter into USB format data, which is in turn provided to a personal computer. In another embodiment of the present invention, the signals imported from an RC transmitter might be in another signal format, for example, pulse width modulated (PWM) format, or pulse code modulated (PCM) format, as will be understood by those of skill in the art. In yet another embodiment, the adapter and microcontroller circuitry is built into a joystick controller. In still another embodiment, the adapter or the joystick controller might be independent without being built into the same device.

The present invention also provides a method and a system for self-generating both analog and digital joystick type control signals, and for converting the self-generated control signals into USB format data for connecting with a personal computer. In an embodiment, self-generated analog and digital joystick signals are generated by a joystick controller, which includes two two-axis gimbals, three switches, one knob, four trims, and status lights.

BRIEF DESCRIPTION OF THE DRAWINGS

The foregoing and other objects, advantages, and features of the present invention will be apparent from the following detailed description and the accompanying drawing, in which.

DETAILED DESCRIPTION OF THE INVENTION

Figure 1:
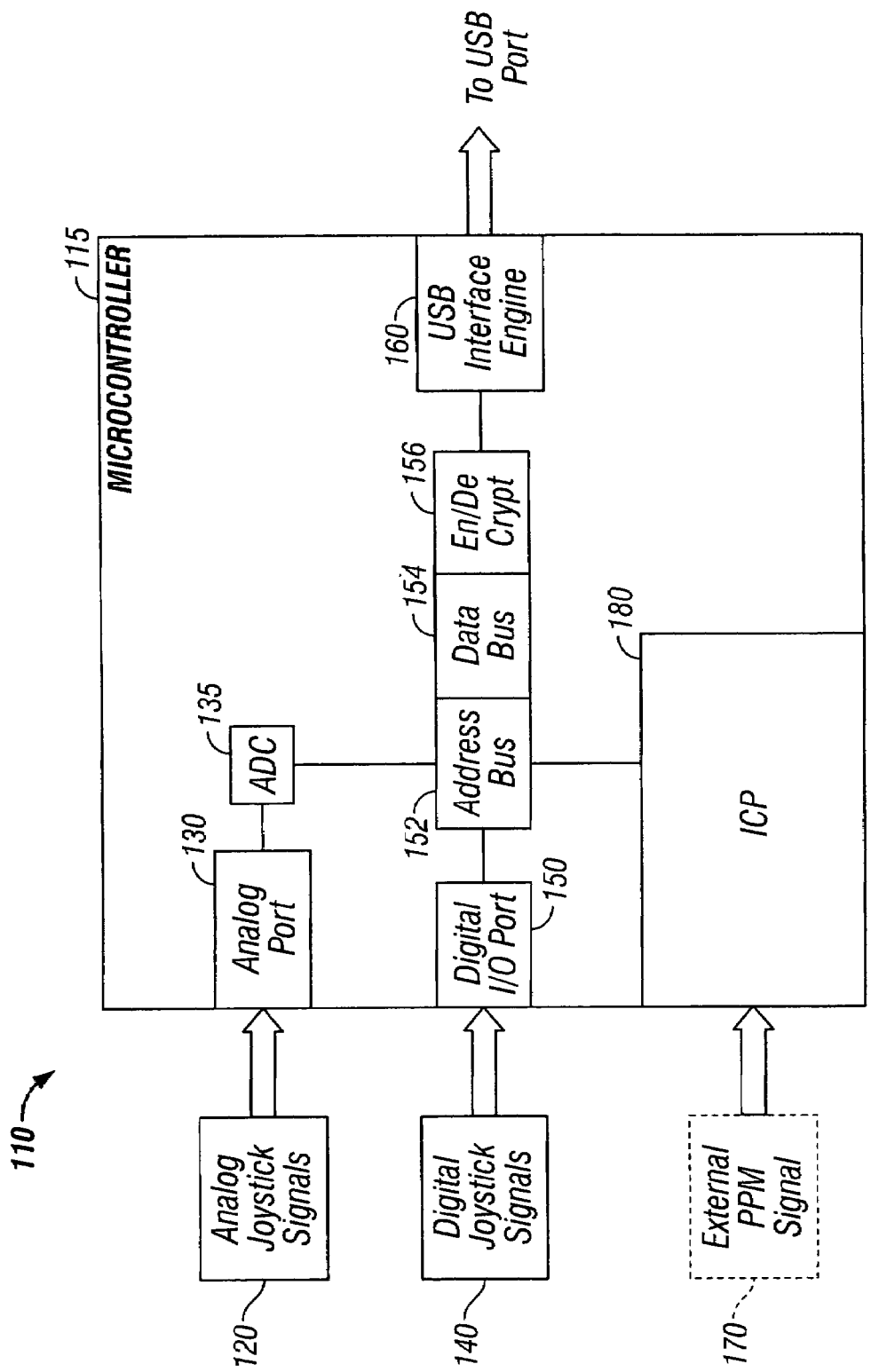
FIG. 1 shows a block diagram of an adapter, in accordance with an embodiment of the present invention.

While the present invention is susceptible to various modifications and alternative forms, certain preferred embodiments are shown by way of example in the drawings and will be described in detail herein. It should be understood, however, that the description is not intended to limit the invention to the particular forms described; to the contrary, the description is intended to cover all modifications, alternatives, and equivalents falling within the spirit and scope of the invention defined by the appended claims.

Inexperienced pilots are apt to seriously damage or destroy an RC model aircraft in the process of learning how to fly using joystick-type controls on an RC transmitter. The use of joystick-type controls distinguishes RC model aircraft aviation from other kinds of aviation. The present invention provides a method and system that allows an inexperienced RC model aircraft pilot to learn how to fly using an actual RC transmitter. Alternatively, the present invention allows for an inexperienced RC model aircraft pilot to learn how to fly using a joystick controller designed to realistically simulate the feel of an actual RC transmitter. Using an adapter, the present invention allows for either an RC transmitter or a joystick controller to be connected to a USB port on a computer on which software is loaded to simulate an RC model aircraft.

Regardless of whether a joystick controller or an RC transmitter is used in the present invention, an adapter 110 is required for converting control signals into USB format data. Referring to FIG. 1, there is shown a logical block diagram of the microcontroller 115 circuitry used, in an embodiment, for converting control signals into USB format data. The adapter 110 is comprised of a controller 115 with analog and digital ports 130 and 150 for analog and digital joystick signals 120 and 140, an input capture port (ICP) 180 for an external pulse position modulated (PPM) signal 170, an address bus 152, data bus 154, encryption logic 156 ("En/De Crypt"), and finally a USB interface engine 160, for interface with a USB port.

According to an embodiment of the present invention, the power needed for self generating the analog and digital control signals 120 and 140 is drawn from the personal computer through the USB port power supply. Analog joystick control signals 120, which might be, for example, a voltage ramp within a certain voltage range generated by the actuation of a potentiometer, are imported to the controller 115 through the analog port 130. In an embodiment of the present invention, the analog port 130 is connected to an 8-bit analog to digital converter ("ADC") 135 for interface with the address and data buses 152 and 154 on the controller 115. Digital joystick control signals 140 are connected to the digital input and output ("I/O") port 150 on the controller 115. Digital joystick control signals 140 might be generated, for example, by a two-position or a three-position switch. As described above, radio control transmitters are commonly manufactured to produce a pulse position modulated (PPM) digital signal. The external PPM signal 170 of FIG. 1 represents an external control signal as generated by one of these commercially available devices.

In the embodiment of the system of the invention shown in FIG. 1, the input capture port 180, analog port 130, and digital I/O port 150 are all included in the same adapter 110. Thus, the adapter 110 is thus easily built-in to the joystick controller 200 (shown in FIGS. 2–4). However, it should be clear to those of skill in the art that, in another embodiment, the adapter 110 might be built separately from the joystick controller, including only an input capture port 180 for a radio control transmitter, without analog or digital ports 130 and 150 for use with a joystick controller, and the present invention should be understood to include such alternative embodiments of the adapter 110. In addition, it is unnecessary for the present invention to have a radio control transmitter 450 (or the external PPM signal 170 it provides). In another embodiment, there may be no radio control transmitter 450, input capture port 180, or external PPM signal 170 provided, and without these elements the system of the invention shown in FIG. 1 could still function to provide training in the use of joystick-type controls with a joystick controller connected to a personal computer. In such an embodiment, self-generated control signals from the joystick controller are converted into analog and digital control signals 120 and 140, and then into USB format data. Thus, the present invention should be understood to include embodiments in which a radio control transmitter is not connected.

Returning to FIG. 1, the external PPM signal 170 is, in an embodiment, amplified upon input to the controller 115, and is imported by the input capture port ("ICP") 180. In another embodiment, the external PPM signal 170 might be amplified and filtered upon input to the controller 115. The ICP 180 is set to identify three characteristics of the external PPM signal 170: the length in time of each pulse in a pulse train which comprises the external PPM signal 170, the total number of pulses in the pulse train, and the synchronous period at the end of each frame in the pulse train. The length of time of each pulse in the pulse train is found by detecting the rising and falling edges of each pulse, and thereby calculating the time gap between the rising and falling edges. The synchronous period at the end of each frame in the pulse train is used to determine where one frame ends and where the next frame begins.

Signals that emerge from both the analog and digital ports 130 and 150 are delivered to the address and data buses 152 and 154. In preparation for delivery to a USB port, the signals are encoded with an encryption scheme, using an encoder and decoder 156 (labeled "En/De Crypt"), which is designed to prevent copying or reverse engineering by a user of the system. Finally, the encrypted signal is delivered to the USB interface engine 160.

According to an embodiment of the present invention, the USB interface engine 160 allows for interface with a USB port, for example, as provided with most personal computers. The USB interface engine 160 processes tokens, handles data transmission and reception, and handshaking as required by USB format standards. In addition, the USB interface engine 160 formats the frames of data within a signal. Within the USB interface engine 160, there is an endpoint register used for indicating whether the microcontroller 115 is ready to transmit or receive, and for tracking how many bytes need to be transmitted or received. When a token for a valid endpoint is recognized by the USB interface engine 160, the data transfer specified by that token takes place through direct memory access ("DMA"), facilitated by the USB port to the personal computer. At the end of this transaction, an interrupt is generated.

Figure 2:
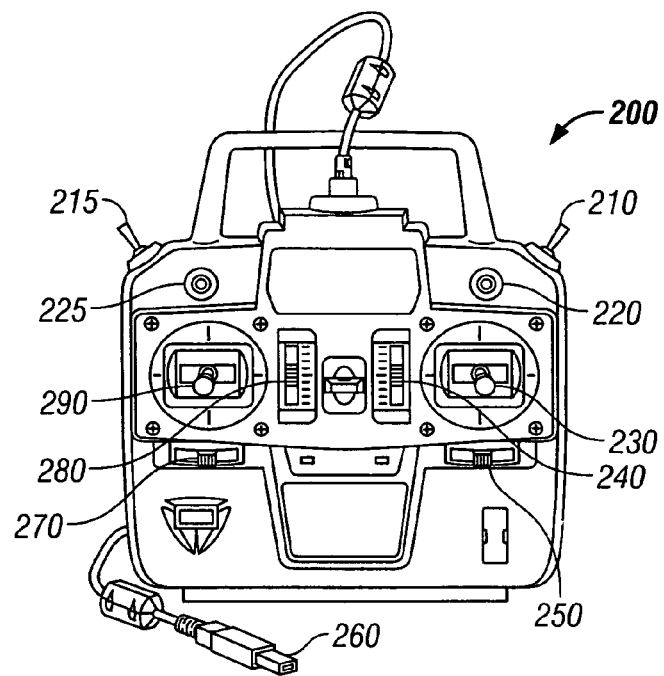
FIG. 2 shows a front view of a joystick controller with a built-in adapter, in accordance with an embodiment of the present invention.

In an embodiment, the present invention also provides a joystick controller for simulating realistically the experience of actually flying an RC model aircraft with a radio control transmitter. A front view of one embodiment of a joystick controller 200 is shown in FIG. 2. The joystick controller 200 has been made to realistically simulate the look and feel of an actual Mode 2 radio control transmitter, as would be used for flying an RC model aircraft. As will be understood by those of skill in the art, Mode 1, 3, or 4 radio control transmitters might also be simulated, and the present invention should be understood to include such alternative embodiments. As shown in FIG. 2, the joystick controller 200 includes two gimbals 230 and 290, one three-position switch 215, two two-position switches 210 and 225, a knob 220, and four trims 240, 250, 270, and 280. The USB port plug 260 is also shown in FIG. 2. Of course, other arrangements of joystick-type controls might easily be substituted for the embodiment shown in FIG. 2.

Figure 3:
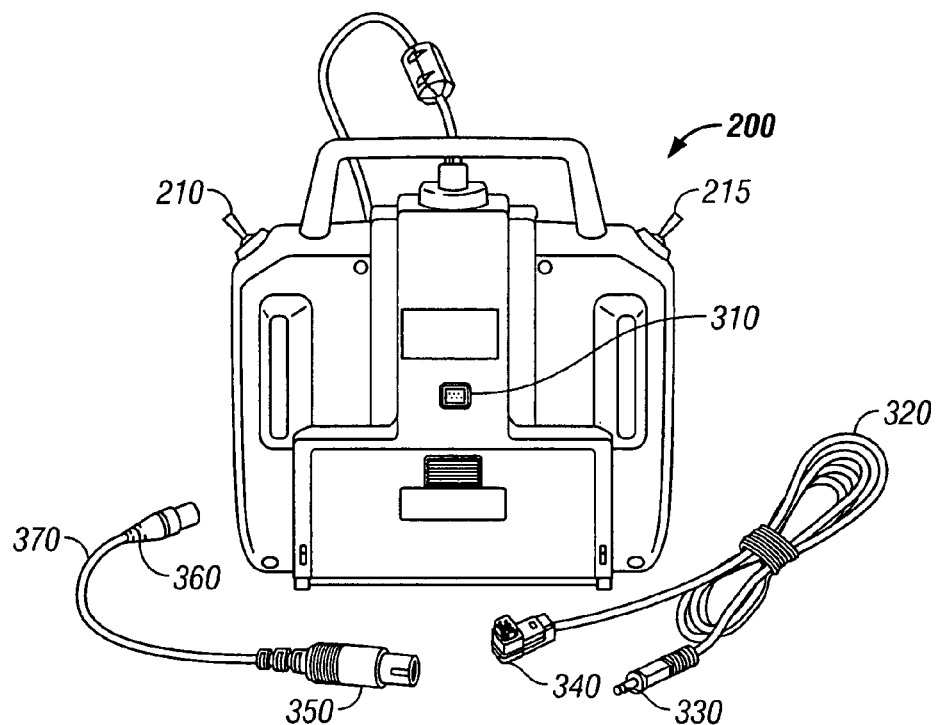
FIG. 3 shows a back view of a joystick controller with a built-in adapter, in accordance with an embodiment of the present invention.

A rear view of the embodiment of the joystick controller 200 shown in FIG. 2 is provided in FIG. 3. The adapter port 310 is shown, along with two cords 320 and 370, which allow for the adapter built into the joystick controller 200 to be connected to a radio control transmitter, such as a Mode 2 radio control transmitter manufactured by JR™ or Futaba™. The cord 320 includes a plug 340 for the adapter port 310 at a first end and a plug 330 for a JR™ radio control transmitter at a second end. Similarly, the cord 370 includes a plug 350 at a first end for connecting to a Futaba™ radio control transmitter, and a socket 360 at a second end for receiving the plug 330 for JR™ radio control transmitters. Thus, the combination of cords 320 and 370 must be used together for connecting a Futaba™ radio control transmitter to the adapter port 310. Of course, as will be obvious to those of skill in the art, other configurations are possible, and the present invention should be construed to include other embodiments, for example, with plugs compatible with Airtronics™, Hitec™, or Tower Hobbies™ radio control transmitters, and with Mode 1, 3, or 4 radio control transmitters.

Figure 4:
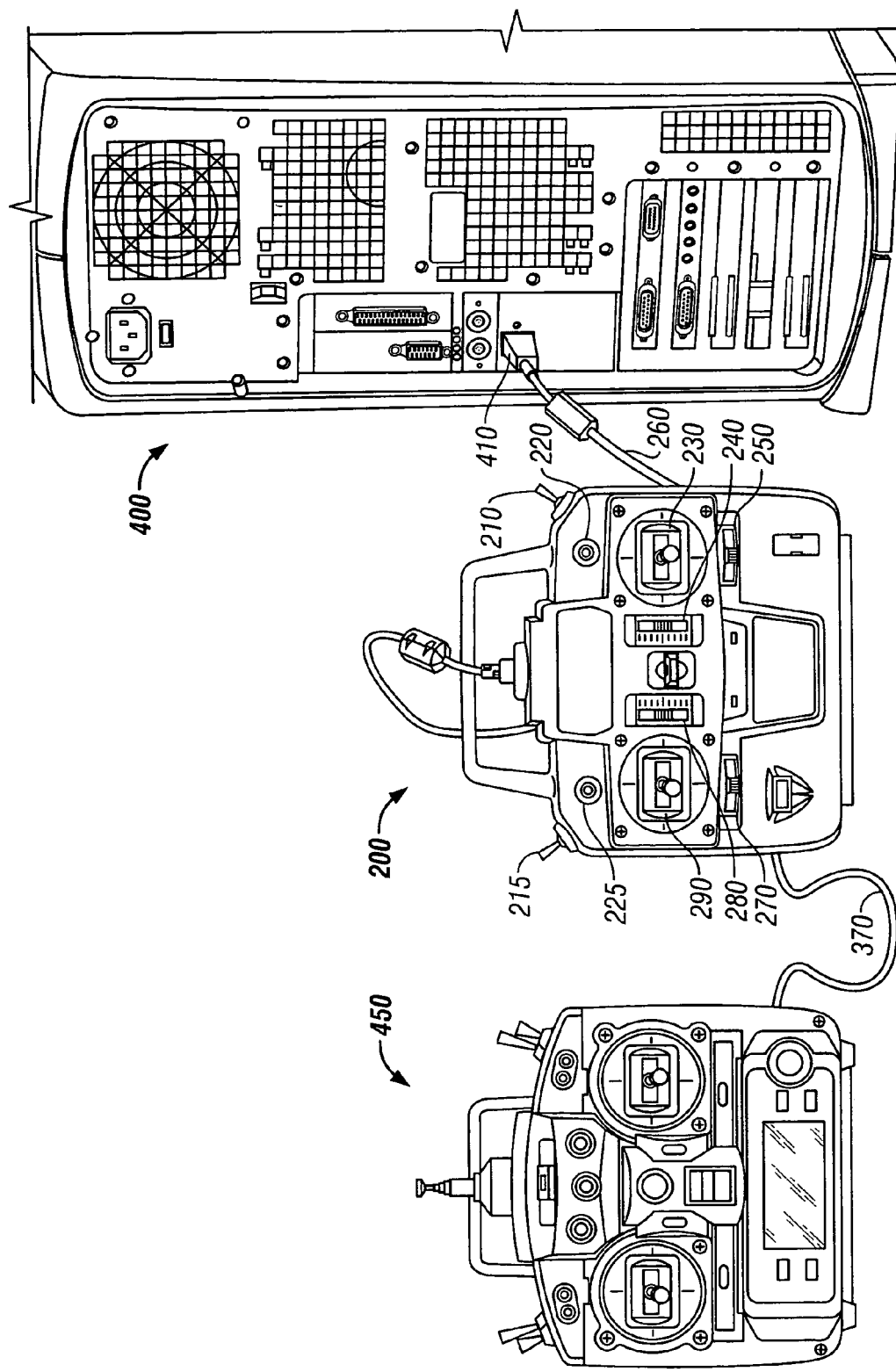
FIG. 4 shows a radio control transmitter connected to a USB port on a personal computer through an adapter built into a joystick controller, in accordance with an embodiment of the present invention.

Finally, in FIG. 4 is shown one embodiment of how an actual radio control transmitter could be connected to a USB port 410 in accordance with the method and system of the present invention. In FIG. 4, an exemplary model of a Mode 2 radio control transmitter 450 is shown connected to the adapter port 310 (which is not visible because it is disposed, in this embodiment, on the rear side of the joystick controller 200) through a cord 370. The joystick controller 200, with the built-in adapter 110, in turn connects to the USB port 410 with the USB port cable 260. The rear side of a computer 400 is shown merely for ease of understanding. USB ports 410 are commonly disposed to the rear side of computers. With the system shown in FIG. 4, control signals generated externally by the radio control transmitter 450 are converted and supplied as USB format data to the USB port 410. Of course, as discussed above, other embodiments of the system are possible. For example, the joystick controller 200 might be replaced with a simple adapter comprising an input capture port 180 and USB interface engine 160, without joystick-type controls, such as gimbals 230 and 290. Also, as discussed above, the radio control transmitter 450 does not need to be connected for USB format data to be generated using the joystick controller 200.

It should be understood that various changes and modifications to the presently preferred embodiments described herein would be apparent to those skilled in the art. Such changes and modifications may be made without departing from the spirit and scope of the present invention and without diminishing its attendant advantages.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. It should be understood that the illustrated embodiments are exemplary only, and should not be taken as limiting the scope of the invention.

What is claimed is:

1. A method for connecting a radio control transmitter to a computer, the method comprising the steps of:

connecting with a cable the radio control transmitter to an external joystick controller, wherein the joystick controller is capable of generating and providing a first control signal to an adapter when the radio control transmitter is inactive;

connecting the joystick controller to the adapter, the adapter being suitable for receiving the first control signal generated by the joystick controller, and for receiving a second control signal generated externally by the radio control transmitter and converting the second control signal into USB format data; and connecting the adapter to a USB port, the USB port being suitable for receiving the USB format data and for providing the USB format data to software loaded on the computer.

2. The method of claim 1, wherein the adapter is built into the joystick controller.

3. The method of claim 2, wherein the joystick controller includes at least one two-axis gimbal.

4. The method of claim 3, wherein the joystick controller also includes at least one switch, at least one knob, and at least one trim.

5. The method of claim 1, wherein, the cable is an adapter cord.

6. The method of claim 5, wherein the adapter cord is suitable for connecting to a Mode 2 radio control transmitter.

7. The method of claim 5, wherein the adapter cord is suitable for connecting to a Mode 1 radio control transmitter.

8. The method of claim 1, wherein, in the step of connecting the adapter to the USB port, the adapter is connected to the USB port with a USB connector.

9. A method for connecting a radio control transmitter to a computer, the method comprising the steps of:

connecting with a cable the radio control transmitter to an external adapter included with a joystick controller external to the radio control transmitter, the adapter being suitable for receiving a first control signal generated by the joystick controller, and for receiving a second control signal generated by the radio control transmitter and for converting the second control signal into USB format data; and connecting the adapter to a USB port, the USB port being suitable for receiving the USB format data and for providing the USB format data to software loaded on the computer.

10. The method of claim 9, wherein the joystick controller is capable of providing the first control signal to the adapter when the radio control transmitter is inactive.

11. The method of claim 9, wherein the joystick controller includes at least one two-axis gimbal.

12. The method of claim 11, wherein the joystick controller also includes at least one switch, at least one knob, and at least one trim.

13. The method of claim 9, wherein, in the step of connecting the radio control transmitter, the cable is an adapter cord.

14. The method of claim 13, wherein the adapter cord is suitable for connecting to a Mode 2 radio control transmitter.

15. The method of claim 13, wherein the adapter cord is suitable for connecting to a Mode 1 radio control transmitter.

16. The method of claim 9, wherein, in the step of connecting the adapter to the USB port, the adapter is connected to the USB port with a USB connector.

17. A system for connecting a radio control transmitter to a computer, the system comprising:

means for connecting the radio control transmitter to an external joystick controller, wherein the joystick controller is capable of generating and providing a first control signal to an adapter when the radio control transmitter is inactive;

connecting the joystick controller to the adapter, the adapter being suitable for receiving the first control signal generated by the joystick controller, and for receiving a second control signal generated externally by the radio control transmitter and converting the second control signal into USB format data; and means connecting the adapter to a USB port, the USB port being suitable for receiving the USB format data and for providing the USB format data to software loaded on the computer.

18. The system of claim 17, wherein the adapter is part of the joystick controller.

19. The system of claim 18, wherein the joystick controller is capable of providing a self-generated control signal to the adapter when the radio control transmitter is inactive.

20. The system of claim 18, wherein the joystick controller includes at least one two-axis gimbal.

21. The system of claim 20, wherein the joystick controller also includes at least one switch, at least one knob, and at least one trim.

22. The system of claim 17, wherein the means for connecting the radio control transmitter includes an adapter cord.

23. The system of claim 22, wherein the adapter cord is suitable for connecting to a Mode 2 radio control transmitter.

24. The system of claim 22, wherein the adapter cord is suitable for connecting to a Mode 1 radio control transmitter.

25. The method of claim 17, wherein the means for connecting the adapter to the USB port includes a USB connector.

* * * * *